(12) United States Patent
Gatz

(10) Patent No.: US 6,840,445 B2
(45) Date of Patent: Jan. 11, 2005

(54) SYSTEM AND METHOD FOR COMPILING A MACHINE SERVICE HISTORY

(75) Inventor: Michael C. Gatz, Chillicothe, IL (US)

(73) Assignee: Caterpillar Inc., Peoria, IL (US)

(*) Notice: Subject to any disclaimer, the term of this patent is extended or adjusted under 35 U.S.C. 154(b) by 0 days.

(21) Appl. No.: 10/314,513

(22) Filed: Dec. 9, 2002

(65) Prior Publication Data
US 2004/0108378 A1 Jun. 10, 2004

(51) Int. Cl.$^7$ .............................. G06F 17/60; G06F 7/00
(52) U.S. Cl. .......................... 235/385; 701/29; 701/35
(58) Field of Search ....................... 235/385; 701/29–35

(56) References Cited

U.S. PATENT DOCUMENTS

| 5,722,469 A | * 3/1998 | Tuminaro ..................... 141/94 |
| 6,249,227 B1 | 6/2001 | Brady et al. |
| 6,317,026 B1 | * 11/2001 | Brodine ..................... 340/5.8 |
| 6,321,983 B1 | * 11/2001 | Katayanagi et al. ........ 235/380 |
| 6,327,576 B1 | 12/2001 | Ogasawara |
| 6,407,665 B2 | 6/2002 | Maloney |
| 2003/0120416 A1 | * 6/2003 | Beggs et al. |
| 2003/0128991 A1 | * 7/2003 | Carling et al. |
| 2003/0191581 A1 | * 10/2003 | Ukai et al. |

* cited by examiner

Primary Examiner—Daniel Stcyr
Assistant Examiner—Daniel A. Hess
(74) Attorney, Agent, or Firm—Kelsey L Milman; Leill & McNeil

(57) ABSTRACT

A system and method for compiling a service history for a machine. A transmitter is attached to a serviceable part for a machine. When the part is installed, the transmitter relays an identification which is received by a receiver preferably attached to the machine. A processor stores the identification and associated machine data to build the service history. The service history data may be relayed to a remote storage system for storage and display.

20 Claims, 3 Drawing Sheets

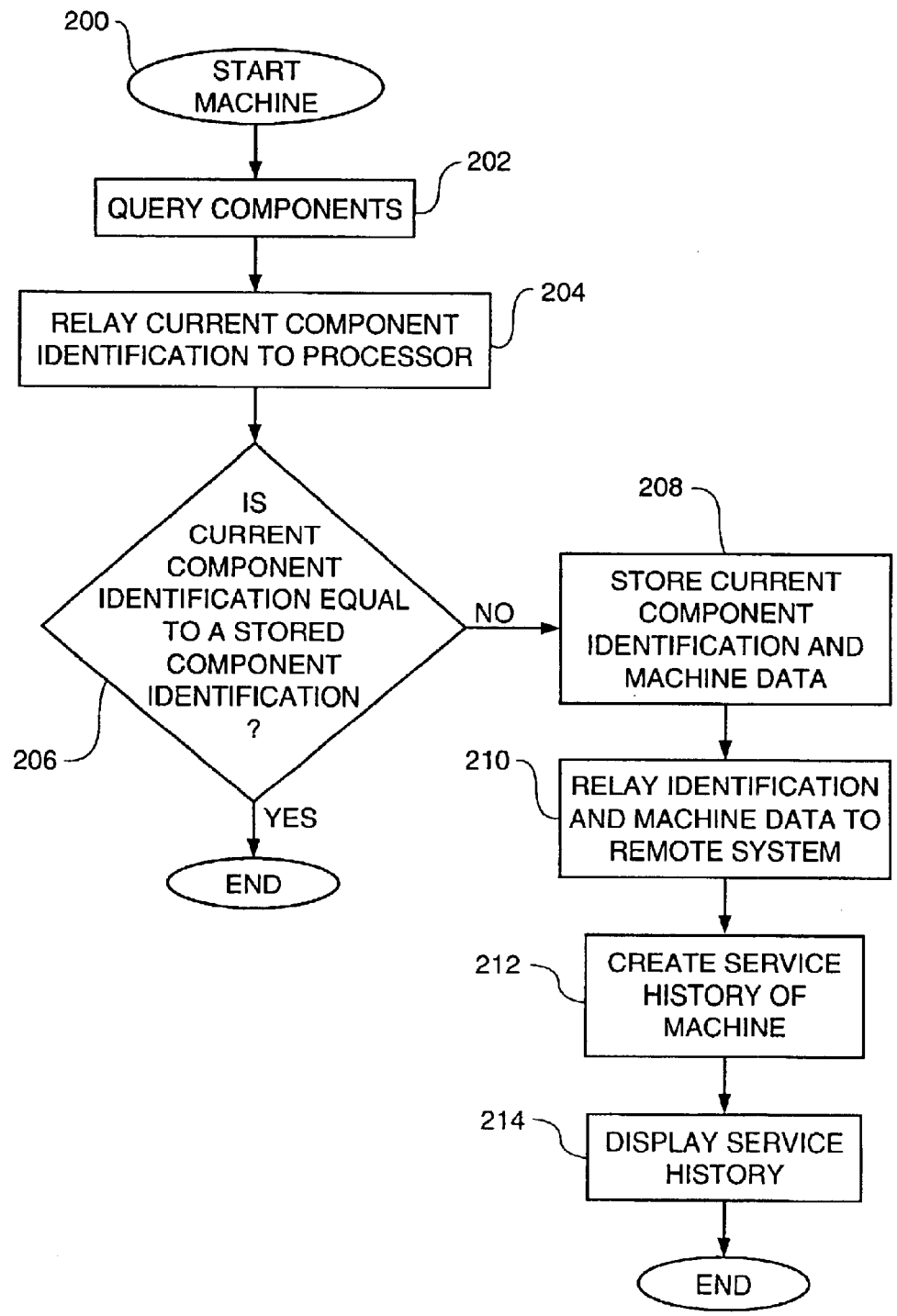

SYSTEM AND METHOD FOR COMPILING A MACHINE SERVICE HISTORY

TECHNICAL FILED

The present invention relates generally to machines having serviceable parts and, more particularly, to developing a machine service history detailing the serviceable parts installed on the machine.

BACKGROUND

Modern machines contain a variety of serviceable parts, such as for example oil or fuel filters, which are periodically replaced as part of routine maintenance of the machine. Typically, this maintenance requires a significant amount of record keeping; for example when a serviceable part is replaced, the technician usually records the serial number (or other identification) of the new part along with pertinent machine data, such as engine hours or machine operating hours. The technician may further record machine operating data, such as oil pressure or engine speed. This information is stored in the machine's service history and provides a time guideline for the next scheduled replacement of the serviceable part.

Although it is generally known to provide an electronic system to manage the data contained in the service history, the technician must remember to manually enter into the system the identification, i.e. serial number, of the serviceable part being installed and the other pertinent data. It is also generally known to provide a bar code scanner or other electronic system to assist in identifying the serviceable part prior to its being installed; however, again, the technician must remember to scan bar code or other identifier attached to the serviceable part for the information to be entered into the service history.

In addition, large machines often have routine maintenance performed in the field, to avoid the effort of transporting the machine to a shop. Therefore, a technician may be required to manually record the identification of the serviceable part and the machine data for entry into the service history at a later time.

Accordingly, the present invention is directed to overcoming one or more of the problems as set forth above.

SUMMARY OF THE INVENTION

It is to be understood that both the foregoing general description and the following detailed description are exemplary and explanatory only and are not restrictive of the invention as claimed.

In a first embodiment, a system for compiling a machine service history is disclosed. The system comprises a transmitter coupled to a current component of the machine, the transmitter adapted to relay a current identification; a sensor adapted to receive the current identification; and a processor adapted to compare the current identification to the expected identification and store the current identification if the current identification is different from the expected identification.

In a second embodiment, a system for compiling a service history of a machine is disclosed. The system comprises a plurality of interchangeable components, each of the components having a transmitter coupled thereto, each transmitter adapted to relay a component identification, each of the plurality of components further adapted to be consecutively coupled to the machine; a sensor adapted to receive the component identification of each of the plurality of interchangeable components while the interchangeable component is coupled to the machine; and a processor adapted to receive the component identifications from the sensor and store each component identification.

In a third embodiment, a method of recording the existence of a current component on a machine is disclosed. The method comprises the steps of relaying from the current component a current identification; receiving the identification; comparing the current identification to an expected identification; and if the current identification is different from the expected identification, recording the current identification.

BRIEF DESCRIPTION OF THE DRAWINGS

The accompanying drawings illustrate exemplary embodiments of the invention and, together with the description, serve to explain the principles of the invention.

FIG. 3 is a flow chart of an exemplary embodiment of a method, consistent with the present invention, for creating a service history for a machine.

DETAILED DESCRIPTION

Reference will now be made in detail to embodiments of the invention, examples of which are illustrated in the accompanying drawings. Whenever possible, the same reference numbers will be used throughout the drawings to refer to the same or like parts.

Figure 1:
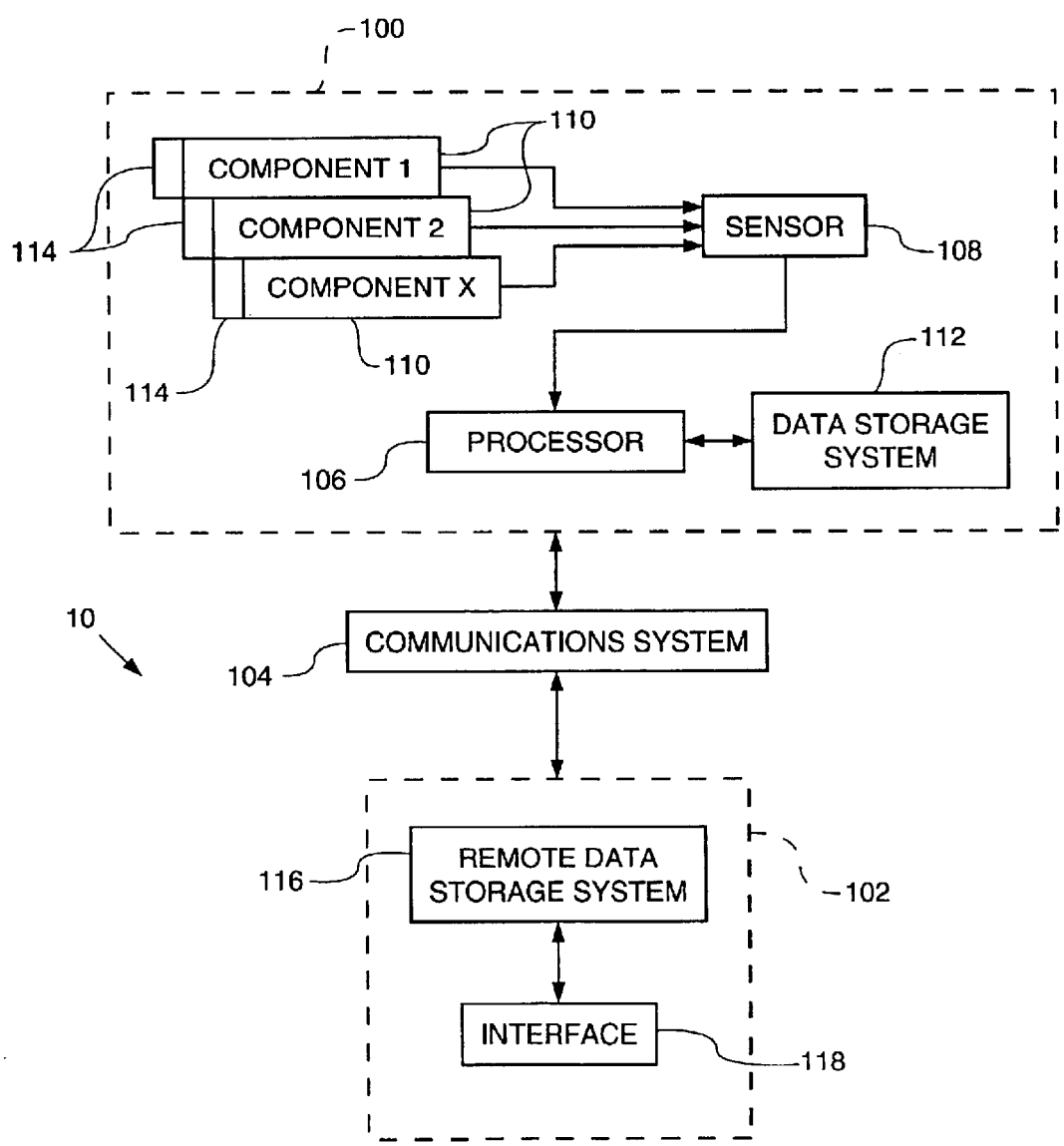
FIG. 1 is a diagrammatic representation of an exemplary embodiment of the present invention.
Figure 2:
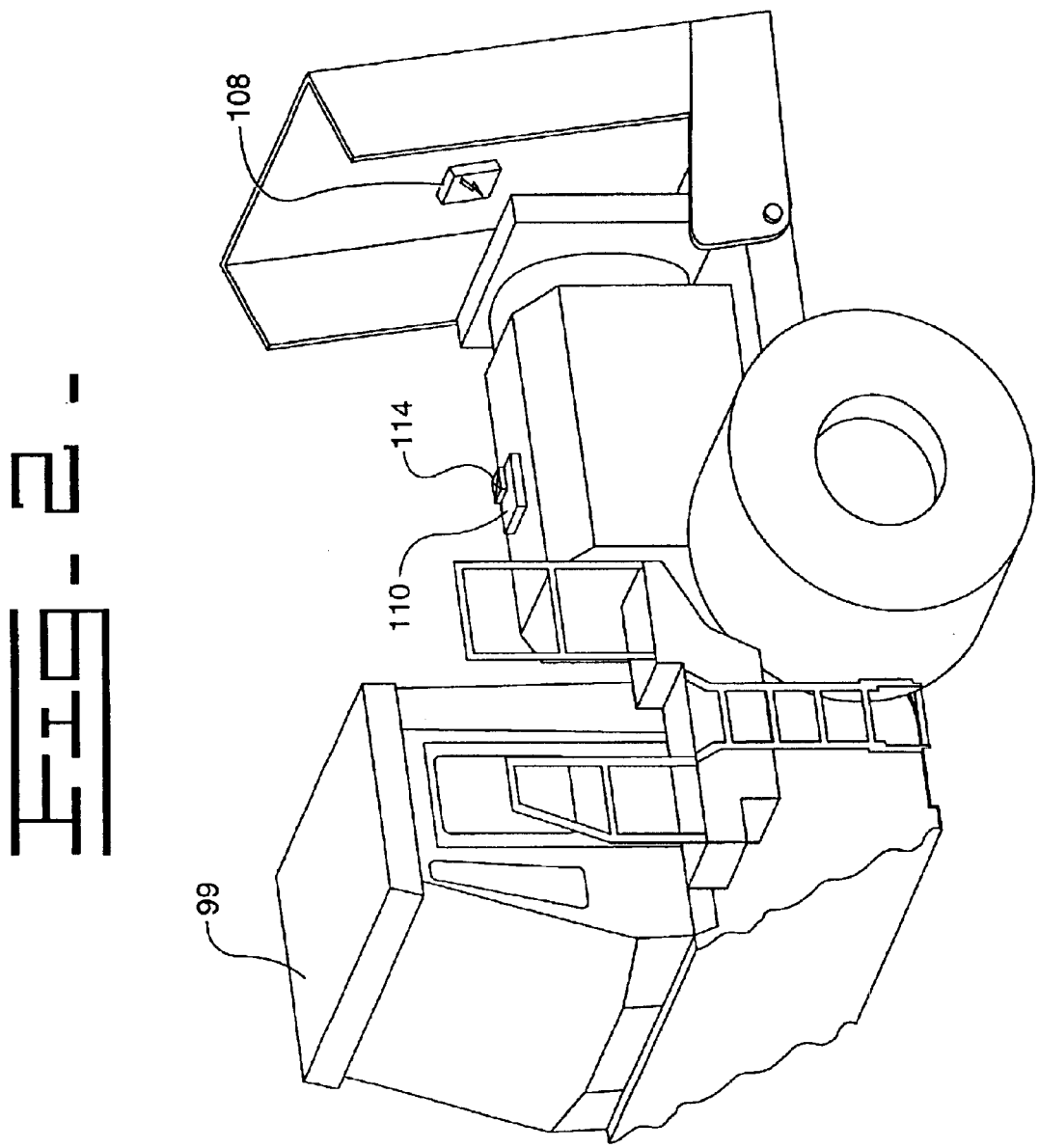
FIG. 2 is a diagrammatic representation of a machine incorporating an exemplary embodiment of the present invention.

FIG. 1 illustrates a system consistent with an exemplary embodiment of the present invention, which is generally designated 10. For purposes of this disclosure, the present invention is described in connection with a work machine 99, such as a track-type tractor, grader, paver, or the like (as can be seen in FIG. 2). However, the present invention is equally well-suited for use with other equipment, vehicles or machines having serviceable parts.

The system 10 preferably includes a machine system 100, a remote system 102, and a communications system 104. The machine system 100 is preferably attached to the machine 99. Alternatively, the machine system 100 may have a portion attached to the machine 99 and a portion located remotely from the machine 99. The remote system 102 is preferably located remotely from the machine 99, although a portion or all of the remote system 102 may be attached to the machine 99.

The communications system 104 preferably communicates with both the machine system 100 and the remote system 102. Preferably, the communication system 104 communicates by wireless communication means, such as satellite, cellular, or radio frequency technology, which are well-known by those skilled in the art. However, the communication system 104 may include an alternate communication means, such as a modem with access to public telephone lines. Alternatively, the communications system 104 may be comprised of wired communications means, such as a wired system located on the machine 99 and having a communications port (not shown). The communications port may allow for wired access to the machine system 100 and the data stored within (as discussed below) by a computing device (not shown), such as a handheld or laptop computer, connected to the communications port. If the communications system 104 is comprised of wired communication means, the connected computing device may function as the remote system 102.

In a first embodiment, the machine system 100 includes a machine processor 106, a sensor 108, one or more components 110, and a machine data storage system 112.

The machine processor 106 controls the functions of the machine system 100 and processes data received from or sent to the remote system 102 via the communications system 104. The machine processor 106 may be comprised of a single control unit, or it may be comprised of a more complicated control system, such as one utilizing numerous control modules or servers (preferably remotely-located), depending on the complexity of the machine system 100 needed for specific applications.

The one or more components 110 are comprised of interchangeable serviceable parts for installation on the machine 99. For example, the components may be comprised of a plurality of oil filters, each of the oil filters being interchangeable and each available for installation on the machine 99. However, each serviceable part typically has a unique identification, such as a serial number, associated with it. The unique identification allows the part (or component 110) to be tracked during shipment and installation.

Each component 110 preferably has a transmitter 114 attached thereto. The transmitter 114 relays the unique identification to allow the component 110 to be identified when it is installed on the machine 99. The transmitter 114 preferably is comprised of an RFID tag capable of wirelessly transmitting the unique identification. However, the transmitter 114 may be comprised of alternate transmission means, such as for example a visual identification or bar code, an infrared or cellular signal, or the like.

The sensor 108 is operably connected to the machine processor 106 and receives wireless transmissions from the transmitter 114. Preferably, the sensor 108 is attached to the machine 99, as seen in FIG. 2, although the position of the sensor 108 depends, in part, on the mode of transmission. For example, the transmitter 114 and sensor 108 may require a line of sight if they consist of a bar code and a scanner, respectively. Preferably, the sensor 108 is comprised of an RFID receiver which receives signals wirelessly from the transmitter 114.

The sensor 108 is preferably capable of receiving transmissions from a plurality of components 110. For example, the machine 99 may include numerous serviceable parts, such as an oil filter, an air filter, and a fuel filter, each of which, when installed, has a transmitter 114 attached thereto. The sensor 108 receives preferably wireless transmissions from each of the transmitters 114 and relays the identifications to the processor 106. If the transmitter 114 and sensor 108 require a line of sight, the sensor 108 may be comprised of a plurality of sensors, each of which is positioned within view of one or more of the installed components 110.

The machine data storage system 112 is operably connected to the machine processor 106 and receives data from the machine processor 106 for storage and provides stored data to the machine processor 106. The machine data storage system 112 preferably is comprised of a memory, database or other storage means capable of storing one or more identifications, such as for example the serial numbers of the components 110, and machine data; however, it may be comprised of a plurality of databases located on one or more computing devices or servers. The machine data storage system 108 may further comprise a processor or controller (not shown) for managing the storage of data. The machine data storage system 112 is preferably located on the machine 99; however, it may be remote from the machine 99.

The remote system 102 is preferably comprised of a remote data storage system 116 and an interface 118. Optionally, a remote processor (not shown) may be operably connected to the remote data storage system 116 and the interface 118 to control the functions of the remote system 102 and process data received from or sent to the remote system 102 via the communications system 104. The optional remote processor may be comprised of a single control unit, or it may be comprised of a more complicated control system, such as one utilizing numerous servers, depending on the complexity of the remote system 102 needed for specific applications.

The remote data storage system 116 preferably includes, at least, storage space for a plurality of identifications and machine data, which comprise at least a portion of the machine service history. The remote data storage system 116 may be comprised of a single database in which the identifications and machine data are stored. Alternatively, the remote data storage system 116 may be comprised of a plurality of databases stored on one or more computers or servers; in addition, the remote data storage system 116 may further comprise a processor or controller (not shown) to manage the storage of data within the system 116.

The interface 118 is operably connected to the remote data storage system 116 and provides a means for personnel to interface with the stored identifications and machine data. The interface 118 preferably includes a display (not shown) and, optionally, an operator input device, such as a keyboard (not shown). However, other types of data transmission and/or interface means, such as, for example, a hand held computing device, voice recognition means, a touch screen, audio, or the like, may be used to interface with the remote system 102. Further, the interface 118 may include real time or delayed communication with the remote system 102, such as an electronic mail or messaging system. And the interface 118 may be operably connected to the remote data storage system 116 via a private network or via an internet or other public network link. Preferably, if the interface 118 is not connected via a private network, any messages relayed between the interface 118 and the remote data storage system 116 will be encoded, as is well known in the art.

Operation of the system 10 is controlled by software that is programmed into the machine and remote systems 100 and 102 by external means. Alternatively, the program can be implemented via hardware or any other programming technique. Creation of this software based upon the description set forth in the specification is within the capabilities of one having ordinary skill in the programming arts.

As seen in FIG. 3, control preferably begins in control block 200 when the machine 99 is started, which preferably involves providing power to the machine system 102. Alternatively, control may begin at different pre-determined times, such as at shut down of the machine 99. As seen in control block 202, the one or more current components 110 installed on the machine 99 are queried. Preferably, the transmitter 114 attached to each component 110 relays its unique identification. The sensor 108, preferably attached to the machine 99, receives each unique identification. The sensor 108 may relay a signal to each transmitter 114 requesting that the transmitter 114 relay the identification. Alternatively, each transmitter 114 may continuously relay the associated identification, and the sensor 108 may, at the predetermined time, accept the relayed transmissions.

As seen in control block 204, the sensor 108 relays each identification to the machine processor 106. The sensor 108 preferably is operably connected to the processor 106 and relays the identification by an electronic signal. Alternatively, the sensor 108 may wirelessly relay the identification to the processor 106, such as for example by a radio signal.

As seen in control block 206, the processor 106 compares the current component identification to a stored, or expected, component identification. Typically, the expected identification is stored in the machine data storage system 112 and is available for retrieval by the processor 106. The expected identification is preferably the identification of the component 110 which, during the previous query, was determined to be installed on the machine 99. If the current and expected identifications are the same, control ends, as it is determined that the component 110 has not been replaced since the previous query. However, if the identifications are not the same, then, it is determined by the processor 106 that a component 110 has been replaced with a new, interchangeable component 110, and, as seen in control block 208, the current component identification and associated machine data are stored in the data storage system 112 of the machine system 100.

Preferably, the machine data to be stored is predetermined. The machine data may include one or more of a variety of time stamps in order to indicate the time at which the current component 110 was detected. For example, the machine data to be stored may include an actual date/time at which the machine 99 was started and the current component 100 detected, or the machine data may include a machine-related time, such as engine or machine operating hours. In addition, the machine data may further include other machine-relevant information, such as for example operating conditions, i.e. oil pressure, engine speed, and the like.

The processor 106 may replace the stored identification and machine data with the current component identification and machine data in the machine data storage system 112. In the alternative, the machine data storage system 112 may have the capacity to store a plurality of component identifications, both previously stored identifications and the current identification, and related machine data.

As seen in control block 210, the identification and machine data may be relayed to the remote system 102. Preferably, this information is relayed by the communications system 104. However, the information may also be downloaded to a portable or handheld computing device, as is well known in the art, for transfer to the remote system 102. The processor 106 preferably controls the relay of the information by the communications system 104. For example, at a predetermined time, such as upon machine start-up or shut down, the processor 106 may poll the machine data storage system 112 to determine if new, non-transferred information is present, which may be indicated by an associated flag. The non-transferred information may be retrieved by the processor 106 and relayed to the communications system 104. The processor 106 may then change the flag to indicate the information has been transferred.

When, the information is transferred to the remote system 102, as seen in control block 212, a service history of the machine 99 is created. Preferably, the service history is comprised of all identifications and associated machine data which have been relayed from the machine system 100. The service history contains at least identifications of all of the serviceable parts, i.e. the components 110, which have been installed on the machine 99 during its life and a time record indicating when the serviceable part was installed. In addition, the service history may contain operating characteristics of the machine 99.

As seen in control block 214, the service history may be displayed. Preferably, the display of the interface 118 allows the automatically generated service history to be displayed to an owner, service technician or other personnel. The interface 118 may allow for some manipulation of the data, such as for example determining the average amount of time elapsing between replacement of a particular type of serviceable part.

INDUSTRIAL APPLICABILITY

The present invention provides a more automated system for compiling a service history of a machine 99, thus minimizing the manual record keeping required of service personnel.

When a machine 99 is being serviced, whether in a shop or in the field, the service technician replaces those serviceable parts which through either visual inspection or scheduled maintenance are indicated for replacement. Each of the new serviceable parts, or components 110, has attached a transmitter 114, such as an RFID tag, which relays a unique identification, such as a serial number, of the part. Rather than the service technician recording the identifications of the new parts installed on the machine 99, the machine system 100, at a predetermined time, such as upon startup, queries all of the serviceable parts to determine if any of them are newly-installed on the machine 99. The processor 106 stores in a machine data storage system 112 the identifications of the newly-installed components 110 and the associated machine data for relay to the remote system 102. When this information is received by the remote system 102, this information is added to the service history being compiled in the remote data storage system 116. The service history may be reviewed by a service technician or other personnel.

It will be readily apparent to those skilled in the art that various changes and modifications of an obvious nature may be made, and all such changes and modifications are considered to fall within the scope of the appended claims. Other embodiments of the invention will be apparent to those skilled in the art from consideration of the specification and practice of the invention as disclosed herein. It is intended that the specification and examples be considered as exemplary only, with a true scope and spirit of the invention being indicated by the following claims and their equivalents.

What is claimed is:

1. A system for compiling a machine service history, comprising:

a machine that includes at least one serviceable component and an associated machine service history;

a transmitter coupled to the serviceable component of the machine, the transmitter adapted to transmit a signal that includes a current identification of the serviceable component;

a sensor adapted to receive a transmission, which includes the current identification, from the transmitter;

a processor adapted to compare the current identification to an expected identification and store the current identification and a time stamp if the current identification is different from the expected identification.

2. The system, as set forth in claim 1, wherein the transmitter comprises an RFID tag and the sensor comprises an RFID receiver.

3. The system, as set forth in claim 1, wherein the sensor and the processor are coupled to the machine.

4. The system, as set forth in claim 3, wherein the processor is further adapted to store current machine data when the current identification is stored.

5. The system, as set forth in claim 4, wherein the current machine data includes engine hours associated with the serviceable component.

6. The system, as set forth in claim 4, further including:
a data storage system located remotely from the machine, the data storage system adapted to store the current identification and current machine data within the machine service history; and
a communication system adapted to relay the stored current identification and current machine data to the data storage system.

7. The system, as set forth in claim 6, further including:
an interface adapted for displaying the machine service history.

8. A system for compiling a service history of a machine comprising:
a plurality of interchangeable components, each of the components having a transmitter coupled thereto, each transmitter adapted to transmit a component identification, the plurality of interchangeable components adapted to be coupled to the machine;
a sensor adapted to receive the component identification of each of the plurality of interchangeable components while the interchangeable component is coupled to the machine;
a processor adapted to receive the component identification of each of the plurality of interchangeable components from the sensor and store each component identification and an associated time stamp.

9. The system, as set forth in claim 8, wherein the transmitters comprise RFID tags and the sensor comprises an RFID receiver.

10. The system, as set forth in claim 8, wherein the sensor and the processor are coupled to the machine.

11. The system, as set forth in claim 8, further including:
a data storage system located remotely from the machine, the data storage system adapted to store each of the component identifications and associated machine data within the machine service history; and
a communication system adapted to relay each of the stored component identifications and associated machine data from the processor to the data storage system; and
an interface adapted for displaying the machine service history stored in the data storage system.

12. A method of recording the existence of a current component on a machine, comprising the steps of:
transmitting from a transmitter coupled to the current component a current identification;
receiving the current identification from the transmitter;
comparing the current identification to an expected identification; and
if the current identification is different from the expected identification, recording the current identification and a time stamp for the current component.

13. The method, as set forth in claim 12, wherein the current identification is relayed by an RFID tag coupled to the current component and wherein the identification is received by an RFID receiver.

14. The method, as set forth in claim 13, wherein the RFID receiver is coupled to the machine.

15. The method, as set forth in claim 12, wherein the current identification is recorded in a memory coupled to the machine.

16. The method, as set forth in claim 12, wherein the recording step further includes recording current machine data.

17. The method, as set forth in claim 16, wherein the current machine data includes engine hours.

18. The method, as set forth in claim 16, further including the steps of:
transmitting the recorded current identification and current machine data to a remote system; and
compiling a machine service history comprised of the current machine data and current identification.

19. The method, as set forth in claim 18, further comprising the step of:
displaying the machine service history.

20. The method, as set forth in claim 12, wherein the transmitting, receiving and comparing steps are performed each time the machine is started.

* * * * *